Patented Feb. 24, 1931

1,793,501

UNITED STATES PATENT OFFICE

SIMON J. LUBOWSKY, OF JERSEY CITY, NEW JERSEY

METHOD OF MAKING TITANIUM DIOXIDE

No Drawing. Application filed September 28, 1929. Serial No. 396,007.

This invention relates to methods of making $TiO_2$ and it comprises an improvement in processes of securing titanium dioxide from rutile wherein the rutile is heated with magnesia, the resulting magnesium titanate is taken up with sulfuric acid, the solution chilled to crystallize and deposit magnesium sulfate and the mother liquor hydrolyzed under heat and pressure to deposit titanic oxide and set free sulfuric acid; all as more fully hereinafter set forth and as claimed.

In the manufacture of titanium dioxide for pigmentary and other purposes, it is customary to produce a solution of $TiO_2$ in sulfuric acid and then hydrolyze this under heat and pressure to produce a precipitate of titanic acid. Small differences in conditions produce great differences in the efficiency of hydrolysis and in the quality of this precipitate. For the best results certain concentrations and acidities are necessary. But as the various minerals containing titanium are chemically intractable, there is considerable difficulty in readily producing the necessary sulfuric acid solution of desirable composition.

In another and prior Patent No. 1,640,952, Aug. 30, 1927, I provide a method of making such a solution wherein rutile is heated with magnesia until the two undergo interaction with the production of magnesium titanate in a form readily attacked by acid. It is usually produced as a sort of a cake, the temperature not being carried high enough to produce fusion; and it will be so referred to hereinafter. The cake can be ground and readily brought into solution by sulfuric acid. The solution diluted somewhat with water and filtered, or settled, gives a clear greenish liquid which on boiling or heating in an autoclave hydrolyzes with deposition of a brilliant white precipitate of meta-titanic acid. This on calcination is changed into pure titanium dioxide of an extremely fine texture and excellent covering qualities. Prior to hydrolysis it is advantageous to submit the solution to a reducing treatment which may be electrolytic. This converts any iron which may be present into the ferrous condition. Practice has shown it is advantageous to carry reduction far enough to reduce some of the $TiO_2$ to a lower state of oxidation.

The present invention relates to certain improvements in the method just outlined. In this method, it will be observed the solution presented for hydrolysis contains considerable amounts of magnesium sulfate. In making the cake, while other ratios of $MgO:TiO_2$ can be employed, it is customary to use a monomolecular ratio; this in weights being one part of magnesia to two parts titania. The solution submitted to hydrolysis then contains sulfate of magnesium and sulfate of titanium in equimolecular ratios; or a magnesium titanyl sulfate.

Since efficient hydrolysis depends on certain particular ratios between the "$SO_4$ ion, the dissolved $TiO_2$ and the water in the solution, in the presence of $MgSO_4$ which contributes "$SO_4$ ion to the solution it is necessary to work with solutions somewhat more dilute as regards $TiO_2$, than can be done in the absence of $MgSO_4$.

In the ordinary routine of operation it is desirable to recover the sulfuric acid of the mother liquor after hydrolysis, that it may be reused on cake; and to recover magnesium sulfate as a salable commodity.

I have now found that it is possible to remove the magnesium sulfate from the cake solution by crystallization under chilling conditions thereby giving me a residual solution in which, for the purposes of hydrolysis, the acidity alone need be considered. Greater $TiO_2$ concentration in the liquid is practicable at the time of hydrolysis; and thereby greater capacity of apparatus and more economical working can be secured. And the mother liquor after hydrolysis can be more economically concentrated to obtain the strength of acid required for dissolving cake.

In a practical embodiment of the present process, rutile is ground to about 150 mesh and intimately admixed with magnesia, either as $MgO$ or as $MgCO_3$. A good proportion is 2 parts by weight of $TiO_2$ in the rutile to 1 part $MgO$. The admixture may be made in a ball mill, and the mixture may be briquetted if desired. The mixture is next heated until a hard semi-vitreous mass or cake is produced. I formerly heated to about Seger cone 18 (about 1500° C.) but I now heat to Seger cone 14 (about 1410° C.) for a somewhat longer period. Either way of heating may be here used. The baked material is ground to rather fine mesh, say 150 mesh, and is treated with ordinary concentrated sulfuric acid at about 90° C. For a cake with the proportions described I find it best to use about 3 parts of acid by weight for each part of cake. Reaction occurs with development of heat, the acid being taken up by the cake. After cooling, I add 6 parts of water to the acidified cake and obtain a clear greenish solution. This solution is clarified by settling or filtration and is then chilled to about 0° C. whereupon a substantially complete crystallization of magnesium sulfate occurs.

The crystals are separated from the residual liquid and the latter is submitted to hydrolysis under heat and pressure; usually at a temperature of about 160° C. in an autoclave. Fine meta-titanic acid separates and is removed, washed and calcined in the usual way. The residual sulfuric acid is concentrated and can be reused on cake.

Reduction of the solution, by electrolysis or otherwise, may precede or follow the separation of magnesium sulfate.

The magnesium sulfate crystals separated from the titaniferous liquor may be drained, washed and purified in the usual ways. If desired the sulfate can be recrystallized to give commercial or C. P. crystallized $MgSO_4.7H_2O$.

What I claim is:

1. In the manufacture of titanium dioxide from rutile, the process which comprises heating a finely ground mixture of rutile and magnesia to form a magnesium titanate, acidifying with sulfuric acid and dissolving in water, chilling the solution to deposit magnesium sulfate, removing the mother liquor and heating it to a high temperature to produce meta-titanic acid by hydrolysis and regain sulfuric acid.

2. In the manufacture of titanium dioxide from rutile, the process which comprises heating a finely ground mixture of rutile and magnesia to form a magnesium titanate, acidifying with sulfuric acid and dissolving in water, chilling the solution to about 0° C. to deposit magnesium sulfate, removing the mother liquor and heating it to a high temperature to produce meta-titanic acid by hydrolysis and regain sulfuric acid.

In testimony whereof I affix my signature.

SIMON J. LUBOWSKY.